United States Patent
Olex et al.

(10) Patent No.: US 9,696,225 B2
(45) Date of Patent: Jul. 4, 2017

(54) LOW FRICTION TAILSTOCK ASSEMBLY

(71) Applicants: Timothy G. Olex, Livonia, MI (US); Warren C. Brown, Northville, MI (US); Richard L. Baird, Metamora, MI (US); Anthony J. Wallen, Livonia, MI (US)

(72) Inventors: Timothy G. Olex, Livonia, MI (US); Warren C. Brown, Northville, MI (US); Richard L. Baird, Metamora, MI (US); Anthony J. Wallen, Livonia, MI (US)

(73) Assignee: Link Engineering Company, Plymouth, MI (US)

( * ) Notice: Subject to any disclaimer, the term of this patent is extended or adjusted under 35 U.S.C. 154(b) by 261 days.

(21) Appl. No.: 14/061,139

(22) Filed: Oct. 23, 2013

(65) Prior Publication Data

US 2015/0107372 A1    Apr. 23, 2015

(51) Int. Cl.
*G01L 3/18* (2006.01)
*G01L 3/00* (2006.01)

(52) U.S. Cl.
CPC ....................................... *G01L 3/18* (2013.01)

(58) Field of Classification Search
CPC .... G01L 3/16; G01L 5/28; G01L 3/18; G01N 19/02; G01N 3/56
USPC ........................ 73/862.12, 10, 862.08, 9, 121
See application file for complete search history.

(56) References Cited

U.S. PATENT DOCUMENTS

| 5,167,148 A | * | 12/1992 | Black et al. | G01L 5/28 73/121 |
| 8,505,374 B1 | * | 8/2013 | Arseneau | G01L 3/24 73/116.05 |
| 2010/0251832 A1 | * | 10/2010 | Kirkpatrick | G01M 17/0074 73/862.191 |

FOREIGN PATENT DOCUMENTS

DE                10113591 C1 * 11/2002 .......... G01M 3/2869

* cited by examiner

*Primary Examiner* — Harshad R Patel
*Assistant Examiner* — Brandi Hopkins
(74) *Attorney, Agent, or Firm* — Miller Canfield (57) ABSTRACT

A tailstock assembly includes a housing, a torque cell supported on the housing and configured to measure loads in a first load range, and a load cell supported on the housing and configured to measure loads in a second load range that is different from the first load range. The tailstock assembly is configured so that the torque cell can be selectively mechanically isolated from the housing. In particular, the torque cell and the load cell are supported on the housing through a low friction bearing, and the tailstock assembly can be selectively switched between a first measurement mode in which the torque cell is fixed to the housing, and a second measurement mode in which the torque cell is mechanically isolated from housing via the bearing. The tailstock assembly may be used as part of a brake dynamometer for accurately measuring both active braking torques and residual drag torques.

11 Claims, 6 Drawing Sheets

LOW FRICTION TAILSTOCK ASSEMBLY

BACKGROUND OF THE INVENTION

In order to address vehicle fuel efficiency standards, designers look to improve efficiencies and performance of all vehicle operating systems, including brake systems. Many vehicles employ disc brakes in their brake systems. A disc brake is a wheel brake that slows or stops rotation of the wheel by the friction caused by pushing brake pads against a brake disc with a set of calipers. Friction between the brake pads and the brake disc causes the disc and attached wheel to slow or stop. After the brakes have stopped the vehicle, the calipers are released from the brake disc. However, it has been recognized that the calipers apply a very low drag force to the disc even in the released position, for example due to the small clearance between the brake pads and the disc and irregularities in the respective surfaces of these components. It has been recognized that fuel efficiencies can be improved by understanding and addressing the residual drag between the brake disc and the brake pads in non-braking conditions.

Inertia dynamometers are used to measure torques generated at the brake during braking, and the measured torques are used in general brake design as well as in improving fuel efficiencies. Typical torque loads generated on the caliper during braking are in the range of 1,200 in-lb to 18,000 in-lb, and may be more than 40,000 in-lb. The torque sensor included in the dynamometer is selected to measure loads in a range of 0 in-lb to 50,000 in-lb with an accuracy of approximately ±50 in-lb. However, the torque sensor that is designed for measuring torque loads in this relatively high-load range is not suited for measuring torque in the relatively low load-load range with the accuracy that is required for measuring residual brake pad drag on the brake disc in a released-caliper brake configuration. For example, measurements of residual drag on the brake disc may include torque loads in the range of 0 in-lb to 225 in-lb, and are typically about 1 in-lb to 6 in-lb. Moreover, the required measurement accuracy in this range is about ±0.125 in-lb. Thus, the torque sensor used to measure active braking is not sufficiently accurate to provide useful measurements of residual drag. In order to fully investigate the operation of a single brake design, a given brake system is frequently tested on different dynamometers having sensors of differing ranges so that both loading modes can be measured with sufficient accuracy. This procedure is labor intensive and prevents understanding how different braking modes affect residual drag since the braking event measurement is performed at a different time and on a different testing machine than a residual drag measurement.

SUMMARY

In some aspects, a dynamometer is configured to be connected to a rotating body. The dynamometer includes a housing; a first load measuring device supported on the housing and configured to measure loads in a first load range, and a second load measuring device supported on the housing and configured to measure loads in a second load range that is different from the first load range. The dynamometer is configured so that the first load measuring device can be selectively mechanically isolated from the housing.

The dynamometer may include one or more of the following features: The first load measuring device and the second load measuring device are supported on the housing via a low friction bearing, where the torque due to friction of the low friction bearing is at least an order of magnitude less than the torque measurement accuracy of the first load measuring device and the second load measuring device. The dynamometer can be selectively switched between a first measurement mode in which the first load measuring device is fixed to the housing, and a second measurement mode in which the first load measuring device is mechanically isolated from housing. The bearing comprises a stator fixed to the housing, and a rotor that rotates relative to the bearing, and wherein the first load measuring device and second load measuring device are fixed to the rotor. The second load measuring device is fixed relative to the first load measuring device. The first load range is at least 4 times greater than the second load range. The first load range is 1,000 in-lb to 40,000 in-lb, and the second load range is 0 in-lb to 225 in-lb.

In some aspects, a tailstock assembly includes a housing; a load transducer including a first side configured to be connected to a load; a coupling that rotatably connects a second side of the load transducer to the housing; and a lock assembly supported on the housing, the lock assembly configured to be switchable between a first configuration in which the coupling is fixed relative to the housing, and a second configuration in which the coupling is rotatable relative to the housing.

The tailstock assembly may include one or more of the following features: The tailstock assembly further includes a low friction bearing disposed between the coupling and the housing such that when the tailstock assembly is in the second configuration. The bearing is a fluid bearing. The bearing is a magnetic bearing. The tailstock assembly includes a stop plate that surrounds a portion of the coupling, and a wedge plate disposed between the stop plate and the housing, the wedge plate movable relative to the stop plate and housing between a first wedge plate position in which the stop plate is urged against the coupling, and a second wedge plate position in which the stop plate is separated from the coupling. The tailstock assembly further includes an actuator that moves the wedge plate between the first wedge plate position and the second wedge plate position. The stop plate includes one of a key and a keyway, and the coupling includes the other of the key and the keyway, such that when the lock assembly is in the first configuration, the key is engaged with the keyway so as to limit rotational displacement between the coupling and the housing. The lock assembly comprises a stop pin supported on the housing adjacent the coupling, and the coupling comprises an opening facing the stop pin, wherein the stop pin is movable relative to the housing between a first stop pin position in which the stop pin is advanced into the opening, and a second stop pin position in which the stop in is retracted from the opening. The tailstock assembly further includes an actuator that moves the stop pin between the first stop pin position and the second stop pin position. The tailstock assembly further includes a second load measuring device, the second load measuring device fixed to the load transducer. The tailstock assembly further includes a second load measuring device and a bearing disposed between the coupling and the housing, the bearing including a stator supported on the housing, and a rotor that rotates relative to the stator and connects the coupling to the second load measuring device. The bearing is a low friction bearing such that when the tailstock assembly is in the second configuration, the rotor rotates relative to the housing with negligible friction.

In some aspects, a brake dynamometer includes a rotatable disk and a brake device arranged to apply a braking force to the rotatable disk. The brake dynamometer is configured to measure, during a single braking event, braking torque during active braking of the brake device and residual brake torque following brake release. The brake dynamometer includes a housing; a first load measuring device supported on the housing, connected to the brake device and configured to measure loads in a first load range, and a second load measuring device supported on the housing, connected to the brake device and configured to measure loads in a second load range that is different from the first load range. The brake dynamometer is configured to be selectively switched between a first measurement mode in which the first load measuring device is fixed to the housing, and a second measurement mode in which the first load measuring device is mechanically isolated from housing.

The tailstock assembly may be used as part of a brake dynamometer for accurately measuring both active braking torques and residual drag torques for a single braking event. This is advantageous relative to some conventional measuring devices which could measure torque loads over a large load range, but could not provide sufficiently accurate measurements (e.g., ±0.125 in-lb) in a low end of the load range. In addition, since the tailstock assembly can sufficiently accurately measure torque loads in a range that encompasses both active braking torque loads and residual drag torque loads, these measurements can be made using a single machine, avoiding time and labor costs associated with using multiple testing devices to obtain these measurements.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

Figure 1:
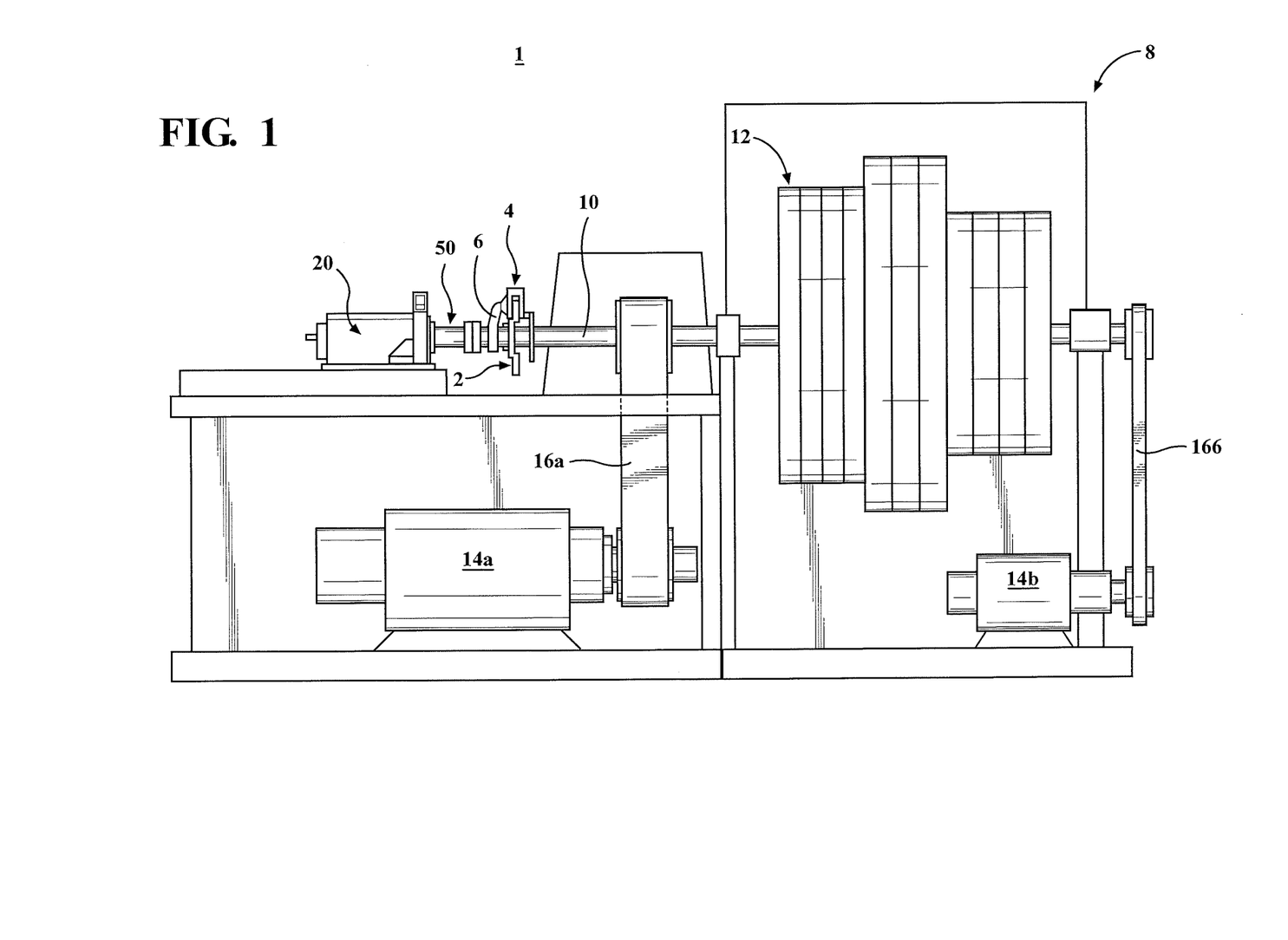
FIG. 1 is a schematic view of a brake dynamometer including a tailstock assembly.

Referring to FIG. 1, a vehicle brake disk 2 and caliper assembly 4 are shown mounted to a shaft 10 of brake dynamometer 1. The brake dynamometer 1 includes a drive system 8 including the shaft 10, inertia weights 12 mounted on the shaft 10, as well as a motor 14a and tachometer 14b connected to the shaft 10 via belts 16a, 16b. The brake dynamometer 1 also includes a tailstock assembly 20 that is connected to the caliper assembly 4 using a fixture 6. The tailstock assembly 20 is configured to accurately measure torque due to active braking and residual drag. In particular, the tailstock assembly 20 can accurately measure, for a single braking event, both the torque applied to the caliper assembly 4 during active braking, which may include relatively high torque loads, for example in the range of 10,000 in-lb to 40,000 in-lb, and residual brake torque following brake release, which may include relatively low torque loads, for example in the range of 0 in-lb to 225 in-lb.

Figure 2:
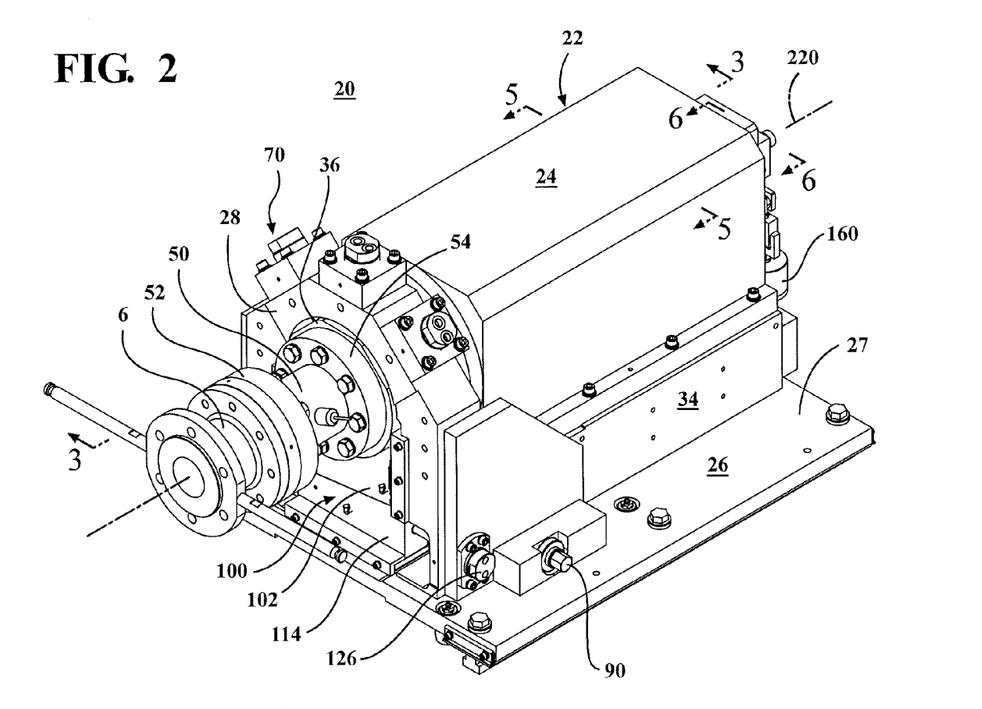
FIG. 2 is a front perspective view of the tailstock assembly.
Figure 3:
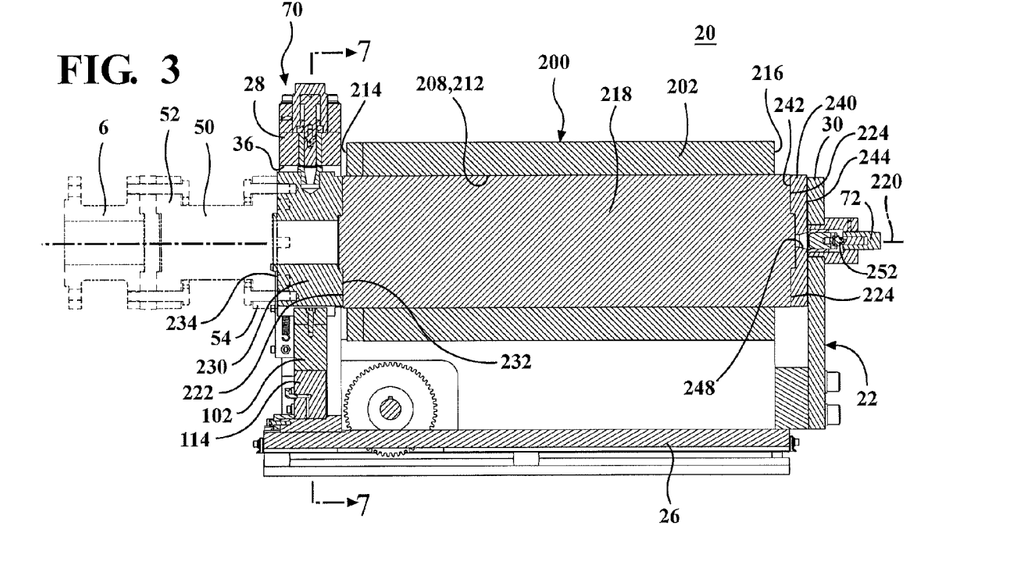
FIG. 3 is a cross-sectional view of the tailstock assembly as seen along line 3-3 of FIG. 2.

Referring to FIGS. 2 and 3, the tailstock assembly 20 includes a housing 22 that supports a torque sensor 50 and a load cell 160 via a bearing assembly 200. The tailstock assembly 20 also includes stop assemblies 70, 100 that are used to selectively change the configuration of the tailstock assembly 20 between a first measurement mode in which the torque sensor 50 is fixed to the housing 22 and relatively high torques are measured using the torque sensor 50, and a second measurement mode in which the torque sensor 50 and load cell 160 are mechanically isolated from the housing 22, and relatively low torques are measured using the load cell 160, as discussed further below.

Figure 4:
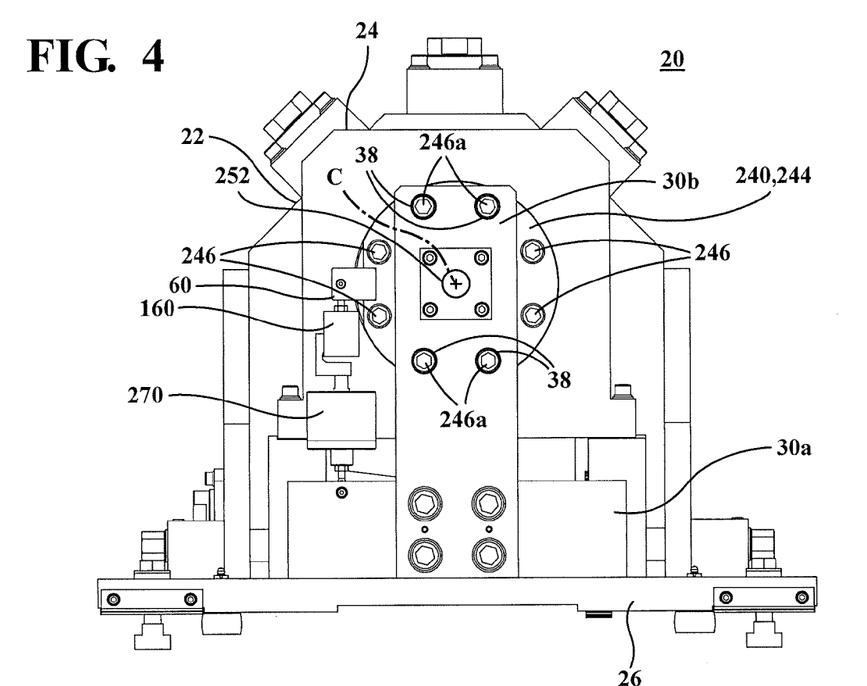
FIG. 4 is a rear end view of the tailstock assembly of FIG. 2.

Referring also to FIG. 4, the housing 22 includes a base 26 that is fixed relative to the brake dynamometer drive system 8, a U-shaped front frame 28 (FIG. 2) and a T-shaped rear frame 30 (FIG. 4) that are welded to an upper surface 27 of the base 26, and a cover 24. As used herein, references to direction such as "upper", "lower", "upward", "downward", "above", "below", "front" and "rear", are made with respect to the orientation shown in the illustrated embodiment, and are not limiting. The U-shaped front frame 28 is oriented relative to the base 26 so that the "U" opens downward, and the front frame 28 defines an axial opening 36 in the housing 22. The T-shaped rear frame 30 is oriented relative to the base 26 so that a cross-member 30a of the "T" rests on the base 26, and a vertical member 30b of the "T" extends upward from the center of the cross-member 30a. The housing 22 also includes a first side frame 32 that extends between the front frame 28 and the rear frame 30 on a first lateral side of the base 26, and a second side frame 34 that extends between the front frame 28 and the rear frame 30 on a second lateral side of the base 26. In addition, the cover 24 resides between the front frame 28 and the rear frame 30, and encloses the bearing assembly 200.

The housing 22 supports the bearing assembly 200. For example, the bearing assembly 200 is an RT series rotary air bearing manufactured by Nelson Air Corporation of Milford, N.H., and includes a stator 202 that is fixed to the housing 22, and a rotor 218 that rotates relative to the stator 202 about a rotational axis 220. Since the rotor 218 is separated from the stator 202 by a layer of air, the main source of friction in the air bearing is due to the viscosity of the air ($\mu_{air}$), where $\mu_{air}=3.62\times10^{-7}$ lb-s/ft$^2$. Thus, the bearing assembly 200 is a low friction bearing. As used herein, the term "low friction" refers to a bearing in which the torque due to friction is at least an order of magnitude less than the accuracy of the measurement made by the load measurement device. In this case, the relevant load measuring device is a load cell 160, described below, that is used to measure residual drag on the brake disc in a released-caliper brake configuration. The load cell 160 is configured to provide torque measurements with an accuracy of measurement of ±0.112 in-lb. Since the viscosity of air is very low, the bearing assembly 200 generates a negligible amount of friction, particularly relative to the caliper assembly drag torque measured by the tailstock assembly 20.

Figure 5:
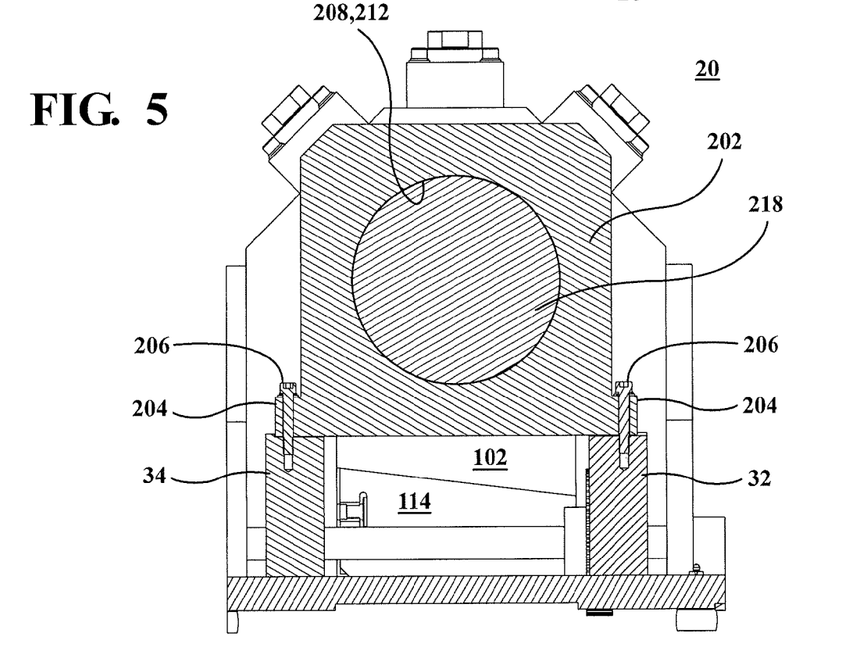
FIG. 5 is a cross-sectional view of the tailstock assembly as seen along line 5-5 of FIG. 2.

Referring also to FIG. 5, a lower edge of the stator 202 includes an outwardly protruding flange 204 that is secured to an upper surface of the first and second side frames 32, 34 via bolts 206, whereby the stator 202 is supported on and fixed relative to the first and second side frames 32, 34. The stator 202 has an inner surface 208 that defines a circular passageway 212 that extends from the stator first end 214, which faces the front frame 28, to the stator second end 216, which faces the rear frame 30.

Figure 9:
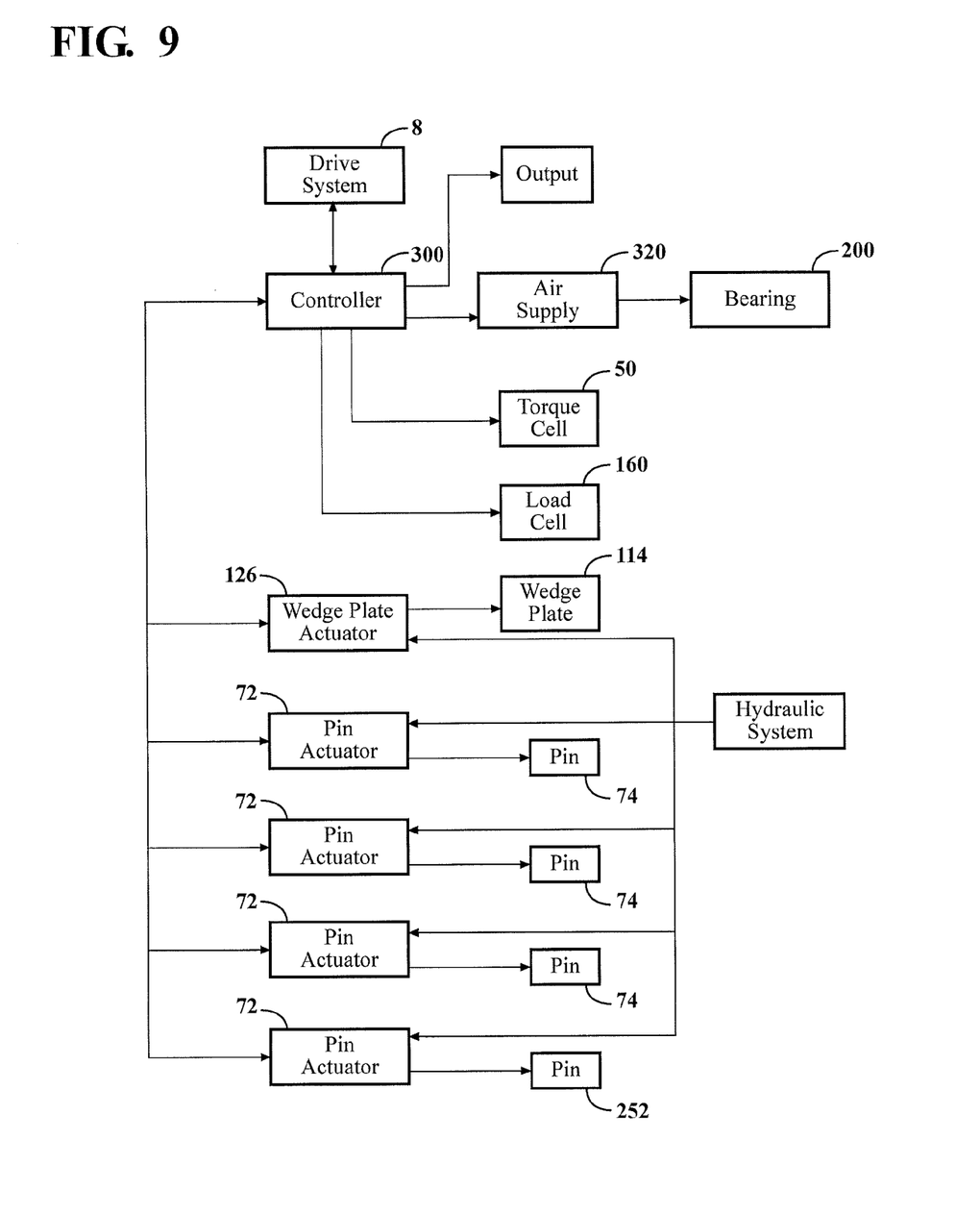
FIG. 9 is a schematic diagram of the brake dynamometer including the tailstock assembly.

The rotor 218 is an elongated cylinder that is disposed within the stator passageway 212. During operation of the bearing assembly 200, the rotor 218 is separated from the stator 202 by an air gap corresponding to the differences in diameter of the rotor 218 and the passageway 212. The rotor 218 is radially centered and rotatably supported within the passageway 212 by pressurized air that is directed into the air gap through air passageways (not shown) formed in the stator 202 that open at the stator inner surface 208. Air is supplied to the air passageways by a pneumatic system 320 (FIG. 9).

The rotor 218 includes a rotor first end 222 that protrudes outward from one end of the passageway 212 so as to reside outside the stator 202 adjacent to the stator first end 214, and a rotor second end 224 that is opposed to the rotor first end 222. The rotor second end 224 protrudes outward from the opposed end of the passageway 212 so as to reside outside the stator 202 adjacent to the stator second end 216.

A first, or front, rotor coupling 230 is secured to the rotor first end 222, for example via bolts (not shown), and couples the torque sensor 50 to the rotor 218. The first rotor coupling 230 is a circular plate having an outer diameter that corresponds to the outer diameter of the rotor 218, and an axial dimension (e.g., the dimension in the direction parallel to the rotor axis 220) that generally corresponds to the axial dimension of the front frame 28. The first rotor coupling 230 extends through the front frame opening 36 adjacent an upper end thereof. The first rotor coupling 230 includes a first face 232 that is secured to the rotor 218, and a second face 234 that is secured to the torque sensor 50.

The torque sensor 50 is a flanged reaction torque sensor such as model 2112-50 k manufactured by Lebow Products (Honeywell International Inc.) of Columbus, Ohio. The torque sensor 50 includes a first flange 52 that connects to the brake caliper assembly 4 via a fixture 6 (only a coupling portion of the fixture 6 is shown in FIGS. 2 and 3), and a second flange 54 that is connected to the first rotor coupling 230. The torque sensor 50 is configured to measure torque loads in a range of 0 in-lb to 50,000 in-lb with an accuracy of ±50 in-lb, and provides an electrical signal proportional to detected loads. The electrical signal is sent to a controller 300 (FIG. 9) for processing, storage and/or output. The torque sensor 50 is used to measure torques generated at the caliper assembly 4 during active braking, as discussed further below.

As best seen in FIGS. 3 and 4, a second, or rear, rotor coupling 240 is secured to the rotor second end 224, for example via bolts 246 (FIG. 4), and faces the rear frame 30. The second rotor coupling 240 is a circular plate having an outer diameter that corresponds to the outer diameter of the rotor 218. The second rotor coupling 240 includes a first face 242 that is secured to the rotor 218, and a second face 244 that is rotatably secured to the rear frame 30. Thus, the torque sensor 50, the first rotor coupling 230, the rotor 218, and the second rotor coupling 240 together form an integral unit.

The second face 244 of the second rotor coupling 240 is secured to the rear frame 30 in a manner that permits rotation of the rotor 218 about the rotor axis 220 over a limited angular range. For example, the rotor 218 is permitted to rotate ±0.7 degrees relative to top dead center. In particular, a subset 246a of the bolts 246 used to secure the second rotor coupling 240 to the rotor 218 are also used to secure the second rotor coupling 240 to the upper end of the rear frame 30. To this end, the rear frame 30 is formed with through holes 38 that receive the subset 246a of the bolts 246. The through holes 38 are formed with extra tolerance to permit the above-described limited rotation of the rotor 218. In this embodiment, eight bolts 246 that are evenly spaced about the coupling circumference are used to secure the second rotor coupling 240 to the rotor 218, and a subset of four bolts 246a are used to secure the second rotor coupling 240 to the rear frame 30 via the through holes 38. The subset of four bolts 246a are arranged so that two bolts 246a are positioned above, and two bolts 246a are positioned below, a center C of the second rotor coupling 240, which lies on the rotor axis 220. In addition, a centering pin 252 is supported on the rear frame 30 at a location corresponding to the center C, and is configured to be selectively advanced into, and retracted from, a corresponding opening 248 formed in the center C of the second rotor coupling 240 using a hydraulic actuator, as discussed further below. The pin 252, when advanced into opening 248, serves to keep the rear end of the rotor aligned with the rotor axis 220 and prevent vibration of the rotor 218 during dynamometer operation.

Figure 6:
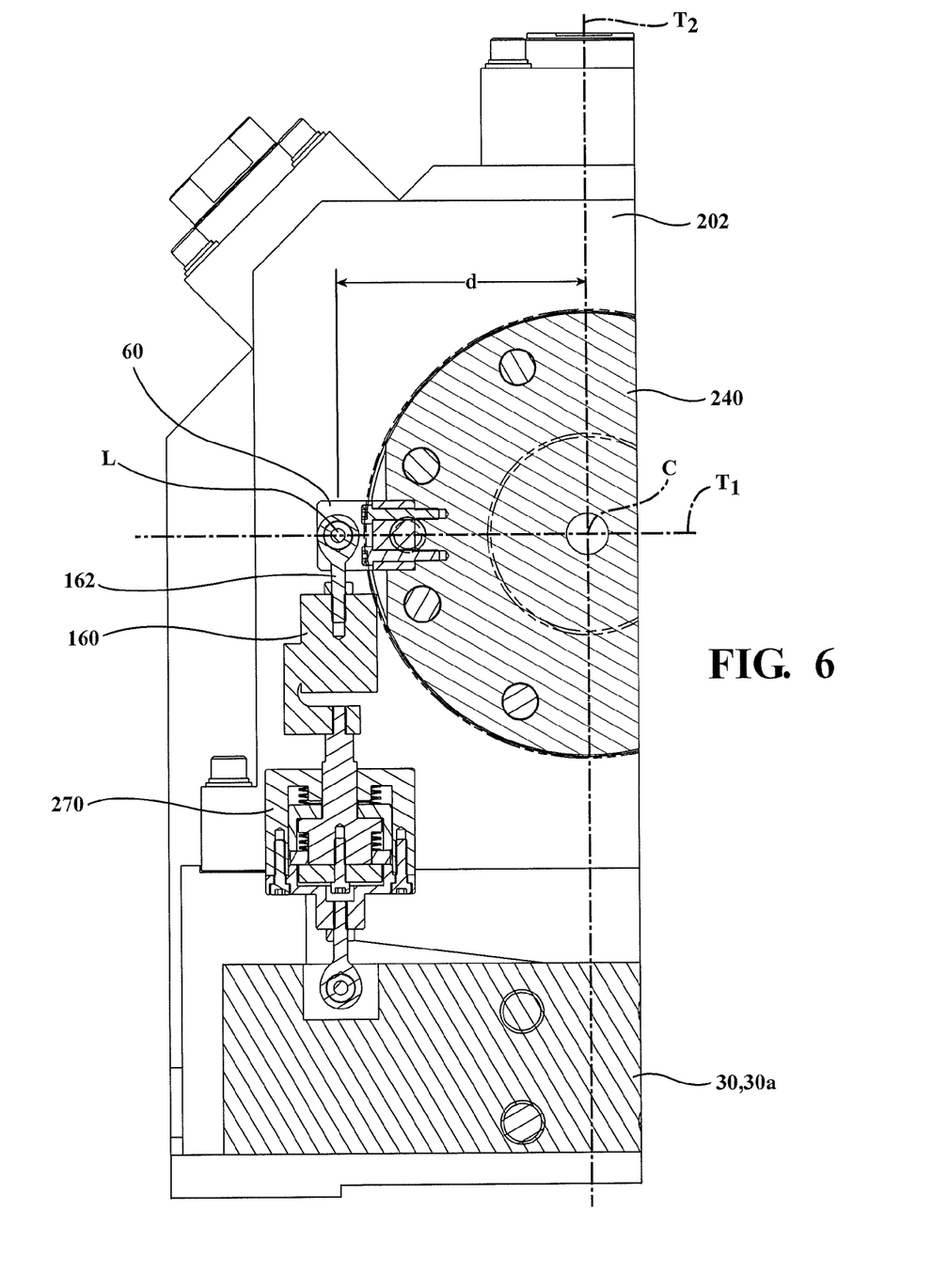
FIG. 6 is a cross-sectional view of the tailstock assembly as seen along line 6-6 of FIG. 2.

Referring to FIGS. 4 and 6, a bracket 60 is provided at a peripheral edge of the second rotor coupling 240 so as to reside along a first transverse axis T1 (e.g., a horizontal axis) that passes through the rotor coupling center C and is perpendicular to both the rotor axis 220 and a second transverse axis T2 (e.g., a vertical axis) that passes through the rotor coupling center C and is parallel to the longitudinal direction of the rear frame vertical member 30a. The bracket 60 extends radially outward beyond the periphery of the second rotor coupling 240. A load cell 160 is secured to the bracket 60 via an eye bolt 162 at a location L positioned along the first transverse axis T1. The location L is a known distance d from the rotor axis 220. The load cell 160 is a model SM-50 S type load cell manufactured by Interface of Scottsdale, Ariz. The load cell 160 is configured to measure forces in a range of 0 lb to 50 lb with an accuracy of ±0.025 lb, and provides an electrical signal proportional to detected loads. In this embodiment, the distance d is 4.25 inches, so that the range of torques measured are in the range of 0 in-lb to 225 in-lb with an accuracy of 0.112 in-lb. The load cell 160 is used to measure residual drag on the brake disc due to pad drag, as discussed further below, an application which requires a measurement accuracy of about +0.125 in-lb.

An overload protection device 270 is used to connect the load cell 160 to the cross member 30a of the rear frame 30. The overload protection device 270 permits some limited movement (e.g., ±0.06 inch) along the load measuring axis of the load cell 160 to prevent damage to the load cell 160 in the event of an unexpected load.

Figure 7:
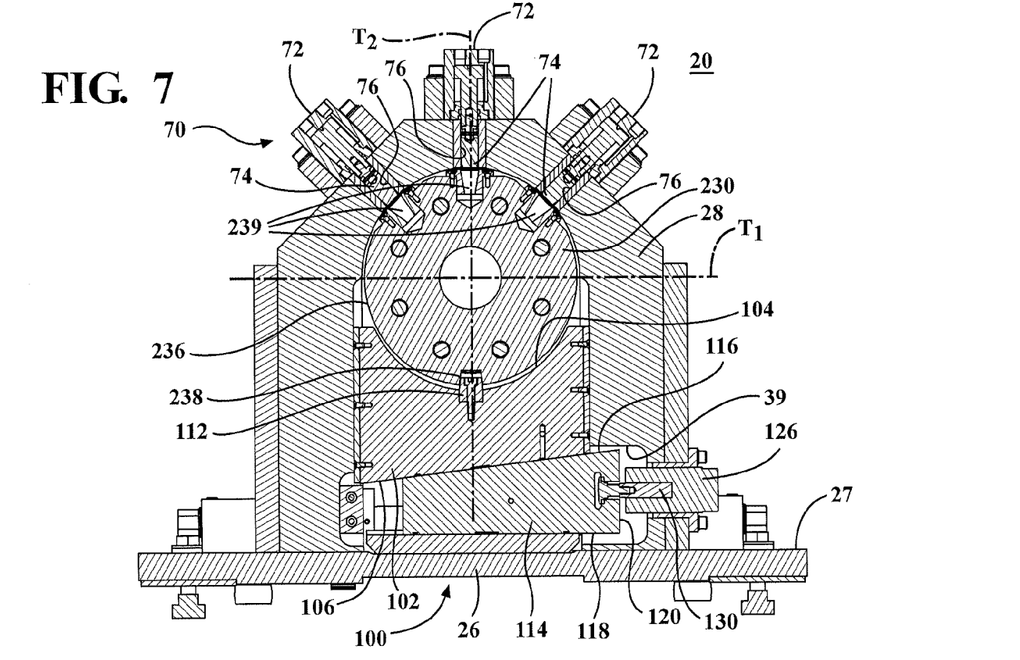
FIG. 7 is a cross-sectional view of the tailstock assembly as seen along line 7-7 of FIG. 3, illustrating the pin stop assembly and the wedge stop assembly in the retracted, or unlocked, position.
Figure 8:
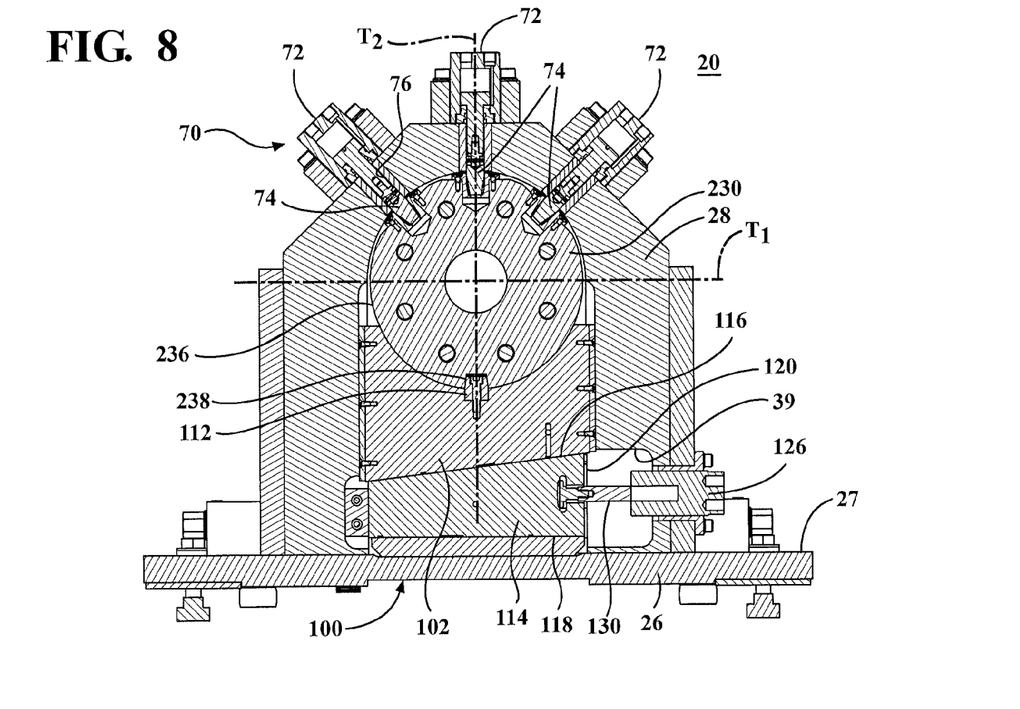
FIG. 8 is a cross-sectional view of the tailstock assembly as seen along line 7-7 of FIG. 3, illustrating the pin stop assembly and the wedge stop assembly in the advanced, or locked, position.

Referring to FIGS. 7 and 8, the tailstock assembly 20 includes a wedge stop assembly 100 and a pin stop assembly 70 that can be actuated in combination to selectively change the tailstock assembly between the first measurement mode in which the rotor 218, and thus the torque sensor 50, is secured to the housing 22, and the second measurement mode in which the torque sensor 50, the rotor 218, and the load cell 160 rotate with low friction relative to the housing 22.

The wedge stop assembly 100 includes a stop plate 102 and wedge plate 114 that are movable relative to the front frame 28. The wedge plate 114 includes a lower (base) edge 118 that is parallel to and contacts the base upper surface 27, and an upper (angled) edge 116 that is angled relative to the transverse axis T1. The wedge plate 114 is configured to move along the base upper surface 27 in a direction parallel to the first transverse axis T1, and a cutout 39 is formed in a lower portion of the front frame 28 to accommodate the translational movement of the wedge plate 114. The stop plate 102 includes a curved edge 104 that confronts the circular peripheral edge 236 of the first rotor coupling 230, and an opposed angled edge 106 that abuts the wedge plate angled edge 116. Although the stop plate 102 rests on the upper angled edge 116 of the wedge plate 114, the stop plate 102 is constrained from moving along the first transverse axis T1 by the presence of the front frame 28, and is thus driven by the motion of the wedge plate 114 to move in a direction parallel to the second transverse axis T2. The stop plate curved edge 104 is shaped and dimensioned to match the shape and dimensions of the first rotor coupling peripheral edge 236. In addition, the stop plate curved edge 104 includes an outwardly protruding key 112 that is shaped and dimensioned to be received in a correspondingly shaped and dimensioned keyway 238 formed in the first rotor coupling peripheral edge 236. The wedge stop assembly 100 further includes a wedge plate actuator 126 including a hydraulically driven piston (not shown) connected to the side edge 120 of the wedge plate 114 via a drive shaft 130. The wedge plate actuator 126 is controlled by the controller 300 to move the stop plate 102 into place adjacent the first rotor coupling peripheral edge 236, so as to support to the rotor 218 without applying a load to the rotor 218.

The pin stop assembly 70 comprises hydraulically actuated pins 74 that extend through radially-aligned pin openings 76 in the front frame 28, and are configured to be movable between a first position in which the pins 74 are retracted away from the first rotor coupling peripheral edge 236 and drawn into the pin openings 76 (FIG. 7), and a second position in which the pins 74 are advanced outward from the pin openings 76 along a radius of the rotor 218, so as to extend into corresponding cavities 239 formed in the first rotor coupling peripheral edge 236 (FIG. 8). Each pin 74 is actuated by a hydraulic actuator 72, which in turn is controlled by the controller 300 (FIG. 9), as discussed below. When the pins 74 are advanced out of the pin openings 76 to the second position, the hydraulic actuators 72 are configured to apply a compressive force to the first rotor coupling 230 via the respective pins 74. For example, in the illustrated embodiment, the pins 74 collectively apply approximately 4000 lb force to an upper side of the first rotor coupling 230, while the first rotor coupling 230, in turn, is supported along its lower side by the stop plate curved edge 104. Thus, the wedge stop assembly 100 and the pin stop assembly 70 together fix the rotor 218 relative to the housing 22.

Referring to FIG. 9, operation of the tailstock assembly 20 within the brake dynamometer 1 is as follows. To measure active torque loads during active braking, the tailstock assembly 20 is configured in the first measurement mode in which the rotor 218, and thus the torque sensor 50, is secured to the housing 22. In particular, the controller 300 signals the wedge plate actuator 126 and the pin actuators 72 to move to the advanced positions (FIG. 8) relative to the front and rear frames 28, 30. First, the stop plate 102 is moved adjacent to the first rotor coupling 230 with the key 112 inserted into the keyway 238, and then the pins 74 are moved into the corresponding cavities 239 of the first rotor coupling 230, whereby the first rotor coupling 230 is compressed between the pins 74 and the stop plate 102. In addition, the pin 252 supported by the rear frame 30 is advanced into the corresponding opening 248 of the second rotor coupling 240. Once the first rotor coupling 230, and thus the torque cell 50, is fixed relative to the housing 22, the torque cell 50 can be used to measure torque associated with active braking. Since the load cell 160 is also fixed to the housing 22 in the first measurement mode, the relatively high loads associated with active braking are not transmitted to the load cell 160, whereby load cell 160 is protected from damage during active braking torque measurements.

Upon completion of the torque measurement using the torque cell 50, the tailstock assembly 20 may then be configured in the second measurement mode in which the rotor 218, and thus the torque sensor 50 and the load cell 160, are isolated from the housing 22. In particular, the controller 300 signals the air supply system 320 to provide pressurized air to the bearing assembly 200. The controller 300 signals the wedge plate actuator 126 and the pin actuators 72 to move to the retracted positions (FIG. 7) relative to the front and rear frames 28, 30. First, the pins 74, 252 are moved to the retracted positions, and then the stop plate 102 is permitted to move to a position spaced apart from the first rotor coupling 230. In addition, the pin 252 supported by the rear frame 30 is withdrawn from the corresponding opening 248 of the second rotor coupling 240. As a result, the rotor 218 is mechanically isolated from the stator 202 via the air gap, and is able to rotate with low friction relative to the stator 202. In this configuration, the torque loads at the caliper assembly due to brake pad drag are transmitted to the load cell 160, where they are measured with sufficient accuracy (e.g., ±0.125 in-lb), for example, to inform brake caliper design decisions or other applications.

Although the load cell 160 is described herein as being a model SM-50 S type load cell, the load cell 160 is not limited to this. For example, other types of load cells can be employed that are designed to fit in the limited available space, and provide measurements of desired accuracy within the desired range. Similarly, although the torque cell 50 is described as being a model 2112-50K flanged torque reaction sensor, the torque cell 50 is not limited to this. For example, other types of torque cells can be employed that are designed to fit in the available space, and provide measurements of desired accuracy within the desired range. Moreover, it is possible to replace the load cell assembly, including the bracket 60, the load cell 160 and overload protector 270, with an axially aligned torque cell of sufficient measurement range and accuracy. Similarly, it is possible to replace the torque cell 50 with a load cell assembly of sufficient measurement range and accuracy.

Although the tailstock assembly 20 is described above as configured for used in a brake dynamometer for testing vehicle disc brake systems, the tailstock assembly is not limited to this application. For example, the tailstock assembly can be used to test drum brake systems in which brake shoes are pushed against a brake drum to control vehicle speed. In addition, the tailstock assembly can be used in other types of dynamometers, and in other applications requiring accurate torque measurements over a large range of loads.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. A tailstock assembly comprising
a housing;
a load transducer including a first side configured to be connected to a load;
a coupling that rotatably connects a second side of the load transducer to the housing; and
a lock assembly supported on the housing and including a stop plate, the lock assembly configured to be switchable between a first configuration in which the coupling is fixed relative to the housing, and a second configuration in which the coupling is rotatable relative to the housing;
wherein the stop plate includes one of a key and a keyway, and the coupling includes the other of the key and the keyway, such that when the lock assembly is in the first configuration, the key is engaged with the keyway so as to limit rotational displacement between the coupling and the housing.

2. The tailstock assembly of claim 1 further comprising a low friction bearing disposed between the coupling and the housing such that when the tailstock assembly is in the second configuration, the load transducer is mechanically isolated from the housing.

3. The tailstock assembly of claim 2 wherein the bearing is a fluid bearing.

4. The tailstock assembly of claim 2 wherein the bearing is a magnetic bearing.

5. The tailstock assembly of claim 1 wherein the stop plate of the lock assembly surrounds a portion of the coupling, and wherein the lock assembly further comprises
a wedge plate disposed between the stop plate and the housing, the wedge plate movable relative to the stop plate and housing between a first wedge plate position in which the stop plate is urged against the coupling, and a second wedge plate position in which the stop plate is separated from the coupling.

6. The tailstock assembly of claim 5 further comprising an actuator that moves the wedge plate between the first wedge plate position and the second wedge plate position.

7. The tailstock assembly of claim 1 wherein
the lock assembly comprises a step pin supported on the housing adjacent the coupling, and
the coupling comprises an opening facing the pin, wherein the stop pin is movable relative to the housing between a first pin position in which the pin is advanced into the opening, and a second pin position in which the pin is retracted from the opening.

8. The tailstock assembly of claim 7 further comprising an actuator that moves the pin between the first pin position and the second pin position.

9. The tailstock assembly of claim 1 further comprising a first load measuring device, the first load measuring device fixed to the load transducer.

10. The tailstock assembly of claim 9 further comprising a second load measuring device and a bearing disposed between the coupling and the housing, the bearing including
a stator supported on the housing, and
a rotor that rotates relative to the stator and connects the coupling to the second load measuring device.

11. The tailstock assembly of claim 10, wherein the bearing is a low friction bearing such that when the tailstock assembly is in the second configuration, the rotor rotates relative to the housing with negligible friction.

* * * * *